US009026119B2

(12) United States Patent
Goshen et al.

(10) Patent No.: US 9,026,119 B2
(45) Date of Patent: May 5, 2015

(54) COORDINATING DISTRIBUTED RADIO VIA REMOTE UNITS

(71) Applicant: Alvarion Ltd., Tel Aviv (IL)

(72) Inventors: Tomer Goshen, Tel Aviv (IL); Rafi Zack, Kiryat-Ono (IL)

(73) Assignee: Alvarion Ltd., Rosh Ha'ayin (IL)

( * ) Notice: Subject to any disclaimer, the term of this patent is extended or adjusted under 35 U.S.C. 154(b) by 0 days.

(21) Appl. No.: 13/779,785

(22) Filed: Feb. 28, 2013

(65) Prior Publication Data

US 2014/0242999 A1    Aug. 28, 2014

(51) Int. Cl.
*H04W 40/00* (2009.01)
*H04W 40/12* (2009.01)

(52) U.S. Cl.
CPC ..................... *H04W 40/12* (2013.01)

(58) Field of Classification Search
CPC ... H04W 16/16; H04W 24/00; H04W 28/048; H04W 48/16; H04W 72/08; H04W 84/12
USPC ................. 455/452.1, 445–455, 422.1–425, 455/67.11–67.16; 370/338
See application file for complete search history.

(56) References Cited

U.S. PATENT DOCUMENTS

| | | | | |
|---|---|---|---|---|
| 5,561,841 A * | 10/1996 | Markus | ........................ | 455/446 |
| 5,682,256 A * | 10/1997 | Motley et al. | ................. | 398/115 |
| 6,314,294 B1 * | 11/2001 | Benveniste | ................ | 455/452.2 |
| 6,650,881 B1 * | 11/2003 | Dogan | ........................ | 455/276.1 |
| 6,892,073 B2 * | 5/2005 | Fattouch | ....................... | 455/446 |
| 7,139,324 B1 * | 11/2006 | Ylitalo et al. | .................... | 375/267 |
| 7,315,592 B2 * | 1/2008 | Tsatsanis et al. | ............. | 375/346 |
| 7,995,969 B2 * | 8/2011 | Hardacker | ...................... | 455/73 |
| 8,503,419 B2 * | 8/2013 | Savoor et al. | ................. | 370/338 |
| 2005/0058151 A1 * | 3/2005 | Yeh | ............................. | 370/445 |

* cited by examiner

*Primary Examiner* — Sharad Rampuria
(74) *Attorney, Agent, or Firm* — Pearl Cohen Zedek Latzer Baratz LLP

(57) ABSTRACT

Provided herein is a dynamically coordination of a distribution of radio signals via distributed remote radio units, with respect to changing numbers and locations of user equipment. A distributing and combining unit combines uplink radio signals from the remote radio units and distributes downlink radio signals from the access unit according to dynamically changing specified criteria. A measurement unit measures performance indicators of the communication between the remote radio units and the mobile communication devices into a matrix of performance indicator values, calculates cost functions therefrom and generates output execution parameters by applying a decision process based on the calculated cost function. Communication criteria are dynamically updated according to the generated output execution parameters and the process is continuously iterative. The invention allows incorporating "smart" capabilities into legacy networks without any major physical changes of the network.

20 Claims, 16 Drawing Sheets

COORDINATING DISTRIBUTED RADIO VIA REMOTE UNITS

BACKGROUND OF THE INVENTION

1. Technical Field

The present invention relates to the field of wireless communication, and more particularly, to management and coordination of multiple distributed remote radio units.

2. Discussion of Related Art

There is an ever growing need for faster communication with larger capacity, especially regarding cellular communication in crowded areas.

FIG. 1 is a schematic block diagram of a communication network such as a distributed-antenna system (DAS) according to the prior art. The network includes an access unit 80 having a traffic module 85 that transmits the communication through access unit 80 and an aggregator 95 that may be embodied within access unit 80. Aggregator 95 communicates with traffic module 85 via communication link 96 and is in communication with remote radio units 90, also termed remote units (RUs), that are connected via communication links 99 to mobile communication devices 70, also termed user equipment (UE). Remote radio units 90 communicate with aggregator 95 over communication links with respect to two kinds of data, that are marked schematically in FIG. 1 as a continuous line 91 for the radio signal to and from mobile communication devices, and as a dashed line 92 for control data (command/messages) between aggregator 95 and the remote units, quality of the communication, transmission parameters etc. The differentiation between the radio signal and the control data applies to both to the downlink channel (DL)—from access unit 80 to mobile communication devices 70 and to the uplink channel (UL)—from mobile communication devices 70 to access unit 80.

DAS system may be passive or active. Passive DAS uses passive components to distribute the RF signal. These passive components are coax cable, splitters, terminators, attenuators, circulators, couplers and filters (duplexer, diplexer or triplexer). Planning DAS includes calculating the maximum loss from base station to each antenna in the systems and the link budget for the particular area that each antenna covers. The passive DAS design needs to adapt to the limitation of the building regarding the restriction to where and how the heavy coax cable can be installed. A detail site survey of the building needed to be done to make sure that there are cable routes to all antennas.

Active DAS consists of a master unit (MU) connected to multiple expansion units (EU) with optical fiber up to 6 km in length. Each EU in turns connects to multiple remote units (RU) with thin coax or CAT5 cable up to 400 m in length. The MU controls and monitors the performance of the DAS. The UEs are distributed throughout the building and the RUs are installed close to the antenna. Active DAS has the ability to compensate for the losses of the cables interconnecting the components in the system by using internal calibrating signals and amplifiers. It does not matter what the distance between the antenna and the base station, all antennas in an active DAS will have the same performance (same noise figure and downlink power).

Both active and passive DAS suffer from several disadvantages. On the UL side the SNR is sensitivity limited due to the contribution of noise level from each RU reception signal. Furthermore, the brute force combining of all the RUs, could add interferences from RUs that don't receive any UE and "contribute" only interferers. On the DL side, the same signal is transmitted via all the RU's although it could contain irrelevant traffic for other spotted areas. That would cause DL interference for the macro deployment, neighbor small cells and redundant use of the radio resources. The DAS being RAN agnostic create a situation where the UL/DL signals couldn't be dynamically coordinated with respect to the RU. It would be agnostic to dynamic of the network traffic.

Another indoor solution is the small cell approach, deploying small IP-based cells as compact, standalone base stations with an integrated radio, baseband, and antenna unit. Base stations typically have integrated antennas, but sometimes antennas come separately. Femtocells can sit on desks, or mount on walls. Generally, picocells and femtocells connect to an IP Ethernet cable as backhaul or, in some cases, receive power over Ethernet. The small cell solution is based on deployment of Femto Access Points (FAP) or Pico cell that coordinated by SON (Self-Organizing Networks) management entity. The FAPs are connected to the Femto-GW via ethernet cables and the Femto-GW that concentrate all the FAPs is connected to the core network entities (SGSN and MCS). Small cells mainly come to provide capacity solution, but it has some challenges and limitations. Since it is most likely that the femto deployment would be in reuse, the system suffers from UL and DL interference between FAP's. Furthermore, the small cell deployment suffers from ping pong handovers due to the multitude of cells within a relevant small area. As a result it harms the QoE (Quality of Experience) in mobility scenarios. Another disadvantage is the lack of effective utilization with regard to number of supported users, meaning that each small cell has a fixed maximum number of supported users (typically up to 32 active users) and as a result it could not support "hot zone" scenarios where many users are located near a single FAP.

There are systems which are using a coordinated small cell solution based on a local controller. The local controller unifies all small cells within each cluster and provides overall traffic aggregation and mobile session management for all services delivered through the cluster. Although it possess a coordination element the coordination inputs are limited to the information provided by L3 and the outputs are limited to the small cell flexibility.

BRIEF SUMMARY OF THE INVENTION

One aspect of the present invention provides a system for coordinating a distribution of radio signals, comprising: a distributing and combining unit connecting remote radio units with at least one access unit by routing radio signals therebetween according to dynamically changing specified criteria; and at least one measurement unit arranged to determine and update the dynamically changing specified criteria, by measuring at least one performance indicator from the routed radio signals to yield a corresponding matrix of performance indicator values and generating a plurality of output execution parameters by applying a decision process to at least one cost function that is calculated from the matrix.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
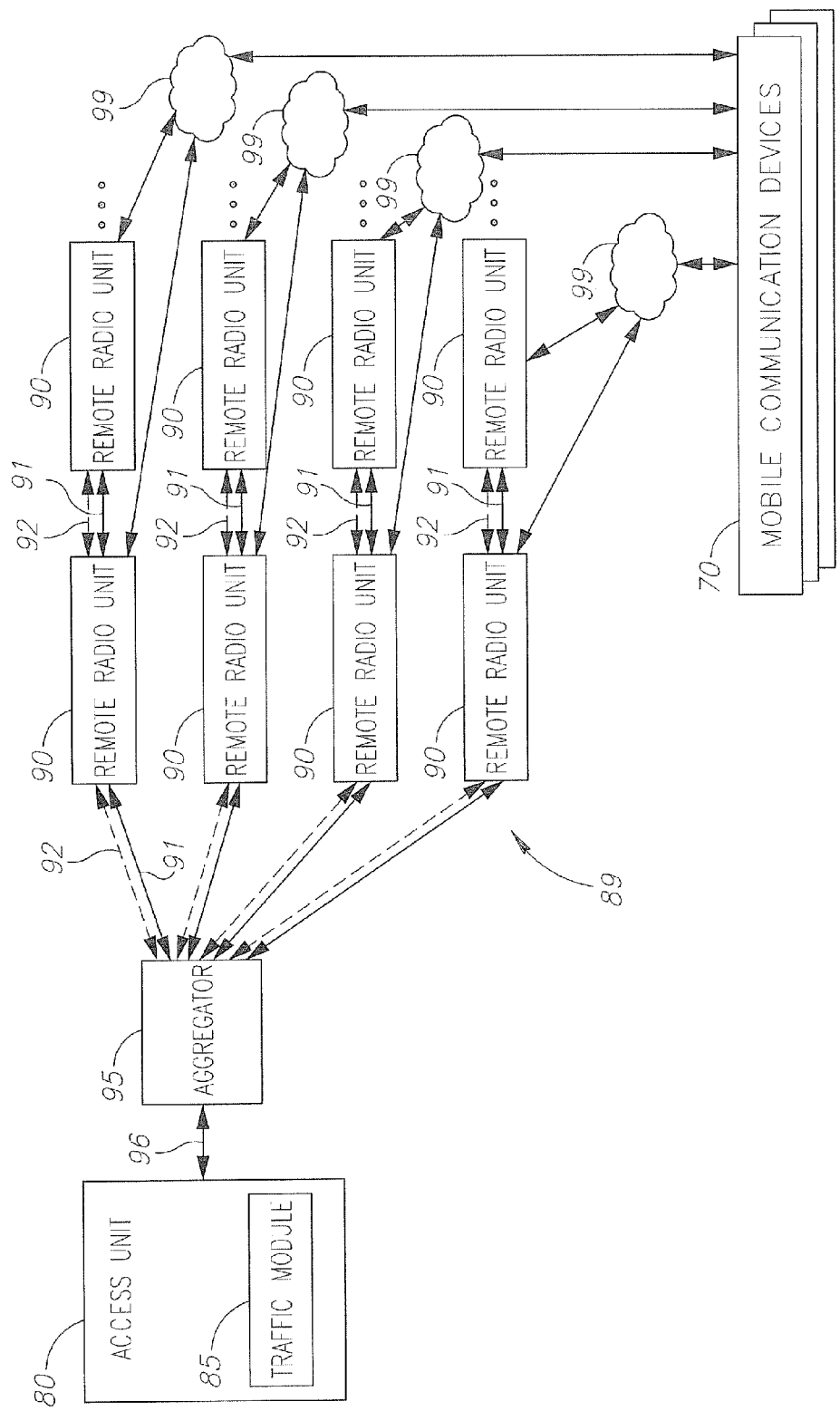
FIG. 1 is a schematic block diagram of a communication network such as a distributed-antenna system (DAS) according to the prior art.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention introduces a new architectural concept that coordinates the distributed radio signals in its various forms as Radio Frequency (RF) baseband signals etc. to maximize air interface utilization in various wireless communication standards such as GSM, GERAN, WCDMA, HSPA, LTE and WiFi. The present invention is applicable e.g. for enhancing indoor cellular coverage and capacity solutions in specified areas.

The present invention introduces a new architecture for wireless communications that allows for efficient managing of communications via remote radio units, with respect to changing numbers and locations of user equipment. The present invention implements a control channel and control and measurement units to the baseband to yield a "smart" access unit that manages (e.g. digitally) the radio signal communication in a dynamical and constantly updating way, which continuously optimizes the operation of the network. The measurement unit measures performance indicators using the uplink and downlink radio signals and generates, for example a corresponding matrix of performance indicator values for each combination of remote radio unit and mobile communication device. The access unit calculates cost functions from the matrix of performance indicator values; generates output execution parameters by applying a decision process that is based on the calculated cost functions, updates the specified criteria according to the generated output execution and reiterates these to continuously update the system.

Figure 2:
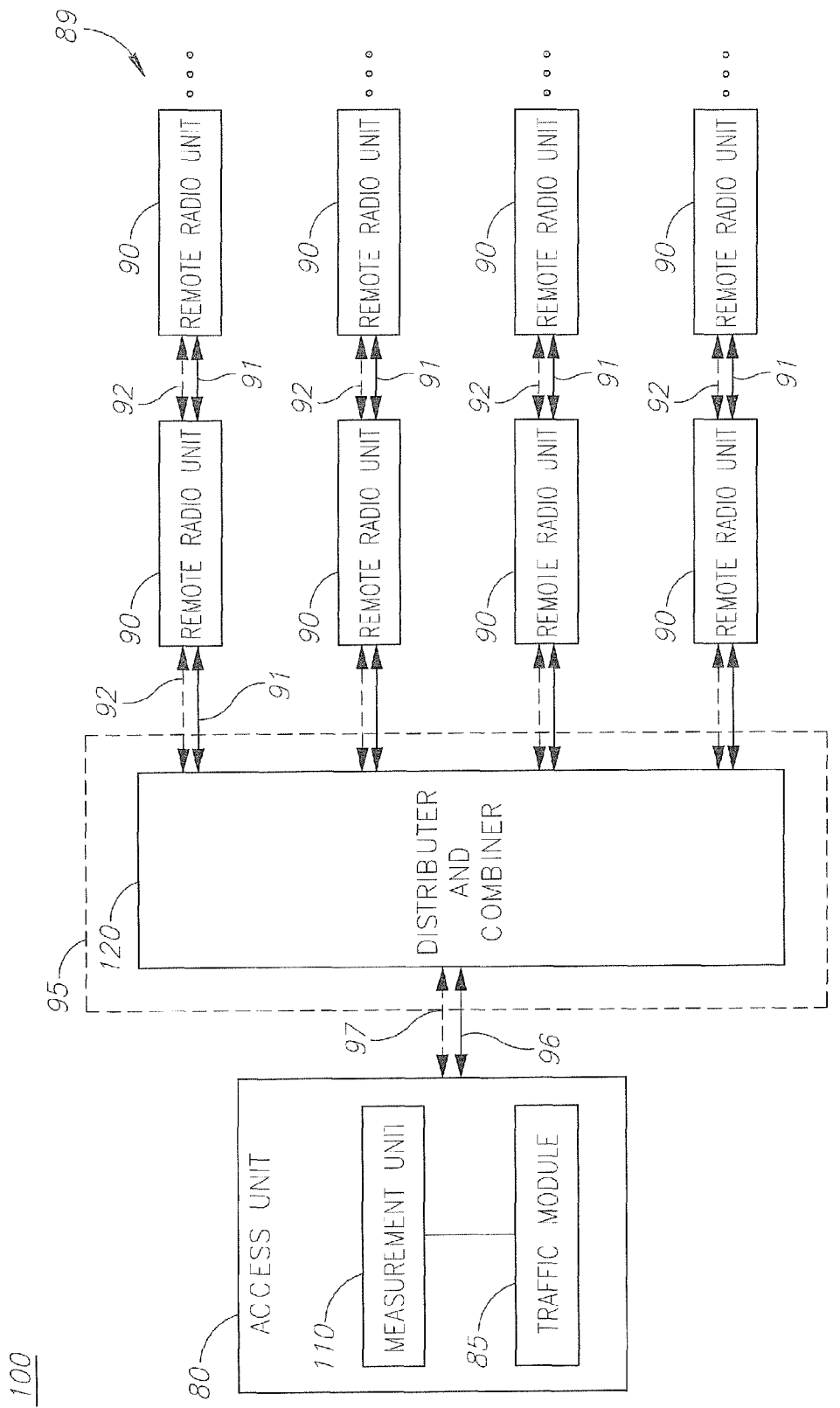
FIG. 2 is a schematic block diagram of system for coordinating a distribution of radio signals, according to some embodiments of the invention.

FIG. 2 is a schematic block diagram of a system 100 for coordinating a distribution of radio signals, according to some embodiments of the invention. System 100 is designed to optimize the wireless link by routing the radio signals themselves in an efficient manner with respect to the users of the communication link, irrespective of the baseband content of the radio signals and irrespective of the higher level packetization. Hence, the proposed systems and methods may be used to add a dimension of communication optimization beyond the methods relating to packet transfer and baseband processing known in the prior art. Optimizing the routing of radio signals through the communication link maximizes the access point utilization.

System 100 comprises remote radio units 90 that are deployed to cover a specified area 93 (see FIG. 9) and are in communication with a plurality of mobile communication devices 70; a distributing and combining unit 120 in aggregator 95 in communication with remote radio units 90; and at least one access unit 80 connected via distributing and combining unit 120 to remote radio units 90.

Remote radio units 90 may be arranged in any configuration, for example in star, chain, ring configuration or a combination thereof. As a generalization, remote radio units 90 are presented in the present application as branches 89 (see FIG. 1) that may contain one or more remote radio units 90 and connected remote radio units 90 may transfer radio and control data along the chain, according to dynamically changing criteria, determined as explained below. System 100 and in particular distributing and combining unit 120 are arranged to transmit and receive control data to and from any of remote radio units 90, utilizing data transfer channels in remote radio units 90, as presented below (see e.g. FIG. 4).

System 100 further comprises at least one measurement unit 110 (e.g. implemented as an independent unit or in at least one access unit 80). System 100 undergoes cycles of measurement and mapping of remote radio units 90, carrying out a decision process based on the measurements and mapping and executing features according to the decisions. The cycles are carried out repetitively to dynamically adjust system 100 to changing channel conditions and user distribution (roaming with mobile communication devices 70) in respect to the deployed array of remote radio units 90.

Distributing and combining unit 120 is arranged to combine uplink radio signals from remote radio units 90 and distribute downlink radio signals from access unit 80 according to dynamically changing specified criteria. Combining and distributing may be carried out on digital radio signals, or may be carried out on analog radio signals. Distributing and combining unit 120 processes both content and non-content data in the radio signals, and specifically communicates non-content data 97 to and from access unit 80 in addition to content data 96. In this, distributing and combining unit 120 makes non-content data 92 from remote radio units 90 available to access unit 80, and may transfer non-content data 97 from access unit 80 to remote radio units 90. Distributing and combining unit 120 dynamically changes the identities of the combined channel and the patterns of channel distribution according to dynamically changing specified criteria, as explained below. Measurement unit 110 may utilize non-content data 97 from aggregator 95 derive the performance indicator values and deliver queries and commands to remote radio units 90.

Measurement unit 110 is configured to measure from the uplink radio signals and the downlink radio signals, at least one performance indicator 135 of the communication between remote radio units 90 and mobile communication devices 70. From the measurement, measurement unit 110 continuously derives and updates a corresponding matrix 140 of performance indicator values for combinations of remote radio units 90 and mobile communication devices 70. A schematic example representing matrix 140 is illustrated in FIG. 3.

Figure 3:
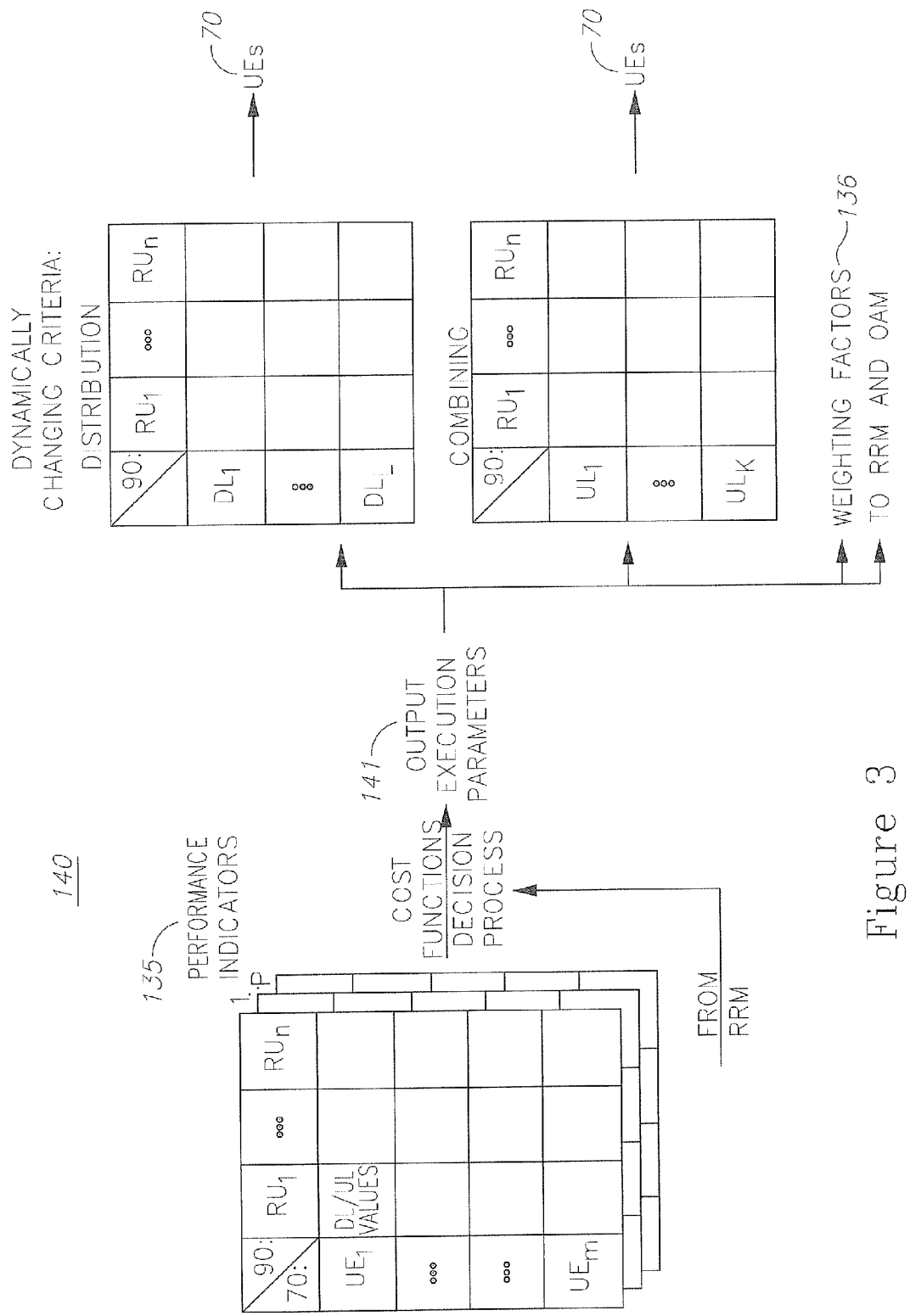
FIG. 3 is an exemplary schematic illustration of the parameters and criteria in the system, according to some embodiments of the present invention.

FIG. 3 is an exemplary schematic illustration of the parameters and criteria in the system, according to some embodiments of the present invention. In the example, matrix 140 is three dimensional, and depicts, for each performance indicator 135 (denoted 1 to p) downlink and uplink values (if relevant) for each combination of mobile communication device 70 (denoted 1 to m) and remote radio unit 90 (denoted 1 to n). Performance indicator values in matrix 140 may be real or complex, scalars, vectors or matrices, depending on the performance indicators, as illustrated below.

The values in matrix 140, as well as external parameters such as RRM (Radio Resource Management) data (see below), are entered into one or more cost functions and output execution parameters 141 are extracted therefrom by a decision process. Output execution parameters 141 are distributed as dynamically changing criteria to distributing and combining unit 120 (as matrices D(i,j) and W(i,j), see FIG. 7 below) to remote radio units 90 (as weighting factors 136, see FIG. 4B) and to traffic module 85 (e.g. to RRM and OAM (operation and management), see FIG. 5).

Examples for performance indicators are: path losses of uplink and downlink channels between various remote radio units 90 and various mobile communication devices 70, channel pattern estimation with respect to the various channel in the system, channel tap, Doppler spreading estimation (regarding speed and fading), time of arrival (as indicator of the physical distances between remote radio units 90 and mobile communication devices 70), Signal to Noise Ratio (SNR) and Signal to Interference plus Noise Ratio (SINR), reference symbol and pilot power estimation, and any other parameter that related to the operation of the communication system and may be derived from any of the system components. In general, performance indicators may relate to any function that has transmission (Tx) and reception (Rx) samples as arguments.

In embodiments, measurement unit 110 estimates channel conditions by performing measurements between each remote radio unit 90 and a specific mobile communication device 70. The reciprocal characteristic between the UL and the DL channel may be used to rely on measurements of UL channels and reflect them both for UL and DL decisions. The measurement may be carried out periodically by switching paths on time division basis.

Measurement unit 110 is configured to calculate at least one cost function from matrix 140 of performance indicator values. Measurement unit 110 is further configured to generate output execution parameters 141 by applying a decision process that is based on the optimization problem performed on the cost function. In general, the cost functions may be any analytic or heuristic function of the performance indicators, which is generally maximized or minimized (depending on the function) by the decision process to derive output execution parameters 141, under given constraints. The cost function may be any function that has transmission (Tx) and reception (Rx) samples as arguments, and may be constructed to allow deriving criteria in the communication system to maximize or minimize the cost function.

For example, the decision process may minimize overall disturbance (e.g. overall transmitted energy) to other communication systems (e.g. other access units) under the constraints of a minimal available bandwidth and minimal SINR per user per channel. Output execution parameters 141 may then relate to the transmission gains of remote radio units 90 and the power balancing of physical channels. In another example, the decision process may maximize and overall or average spectral efficiency as a function of SDMA (spatial division multiple access, see FIG. 9) resource distribution and channel allocation. In a further example, output execution parameters 141 may relate to spatial parameters of the antenna beams of remote radio units 90, and may include beam forming parameters with respect to mobile communication devices 70.

In embodiments, output execution parameters 141 may comprise real or complex scalars, vectors or matrices. For example, output execution parameters 141 may comprise Tx/Rx gain factors per remote radio units 90 (scalars), Tx/Rx filters per remote radio units 90 (vectors), associations of resource allocation per physical channel and user to the relevant stream in SDMA configuration stream (matrices), associations between UL/DL MIMO (per user) stream and RU stream (matrices), parameters of smart maximal-ratio combining (MRC) methods and internal allocations that utilize the spatial diversity of antennas in the MIMO, RU and UE channels.

The derived output execution parameters 141 and criteria are changed dynamically in the system, to continuously adapt for changing network conditions and user distribution. Access unit 80 is configured to update the specified criteria according to the generated output execution. For example, gains of remote radio units 90 may be adjusted according to measured path losses. The dynamically changing specified criteria may be adjusted to dynamically modify transmission of remote radio units with respect to a number of proximate mobile communication devices as derived from the performance indicator values. For example, The dynamically changing specified criteria may be adjusted to dynamically enhance or diminish transmission of remote radio units 90 having respectively more or less proximate mobile communication devices 70 with respect to other remote radio units 90 as derived from the performance indicator values. The system may further adapt to a continuously changing topology and spatial distribution of UEs.

The decision process may be carried out in respect to individual or groups of mobile communication devices 70, individual or groups of remote radio units 90, as well as to individual or groups of streams and individual or groups of physical channels.

Access unit 80 is further configured to reiterate the measuring, the calculating and the updating to continuously update system 100, thereby optimizing its performance as quantified by the cost functions. For example, access unit 80 may continuously minimize an overall energy use in the specified area while keeping an overall connectivity level for each mobile communication device 70 above a specified threshold in the specified area.

In embodiments, access unit 80 is arranged to minimize the interference for other communication systems neighboring access unit both for UL and DL channels. Furthermore, access unit 80 may trace or create isolated zones between groups of UE's and utilizes its multiple streams to reuse the physical resources (i.e frequency, subcarriers, time, code) between the UE groups.

FIG. 3 schematically illustrates the process described above, by showing output execution parameters 141 as emerging from the decision process that is based on the calculated cost functions (having their inputs as performance indicator values from matrix 140, as well as from external sources such as the RRM of traffic module 85, see also FIG. 5 below). Output execution parameters 141 are employed through distribution and combining parameters illustrated schematically in the tables (See also FIG. 7), as well as through weighting factors 136 (see FIGS. 4B and 4C) and parameters relating to traffic unit 85 (see FIG. 4A).

For example, performance indicators 135 may be path losses. The transmission of remote radio units 90 may be enhanced by adjusting a power level of each channel of access unit 80 and adjusting gain factors at transmit circuits of each remote radio unit 90. The cost function may be an overall energy use in the specified area. This cost function may be minimized by enhancing transmission of remote radio units 90 having more proximate mobile communication devices 70 than other remote radio units 90. Access unit 80 may be thus arranged to yield an overall connectivity level for each mobile communication device 70 above a specified threshold in the specified area. The overall connectivity level may be defined as a weighted sum of the measured path losses with respect to the adjusted gain factors of the corresponding remote radio units, and further in respect to the adjusted power level of the corresponding channel.

Path losses may be measured for either or both uplink and downlink channel. In the latter example, downlink path losses and uplink path losses may be measured as separate performance indicators 135. In another embodiment, DL path losses may be derived from UL path losses.

Figure 4A:
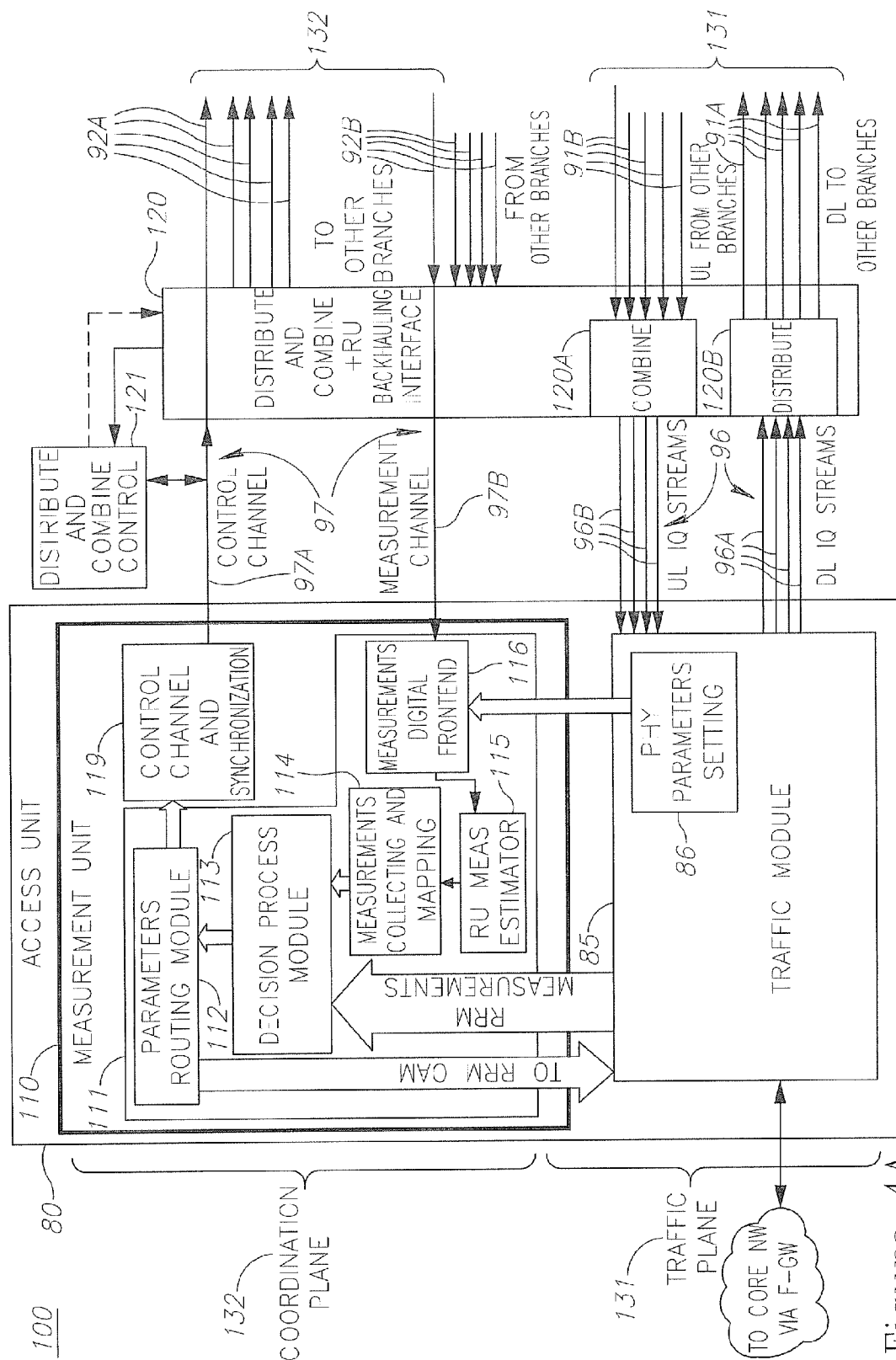
FIGS. 4A-4C are schematic functional block diagrams of the system, according to some embodiments of the invention.
Figure 4B:
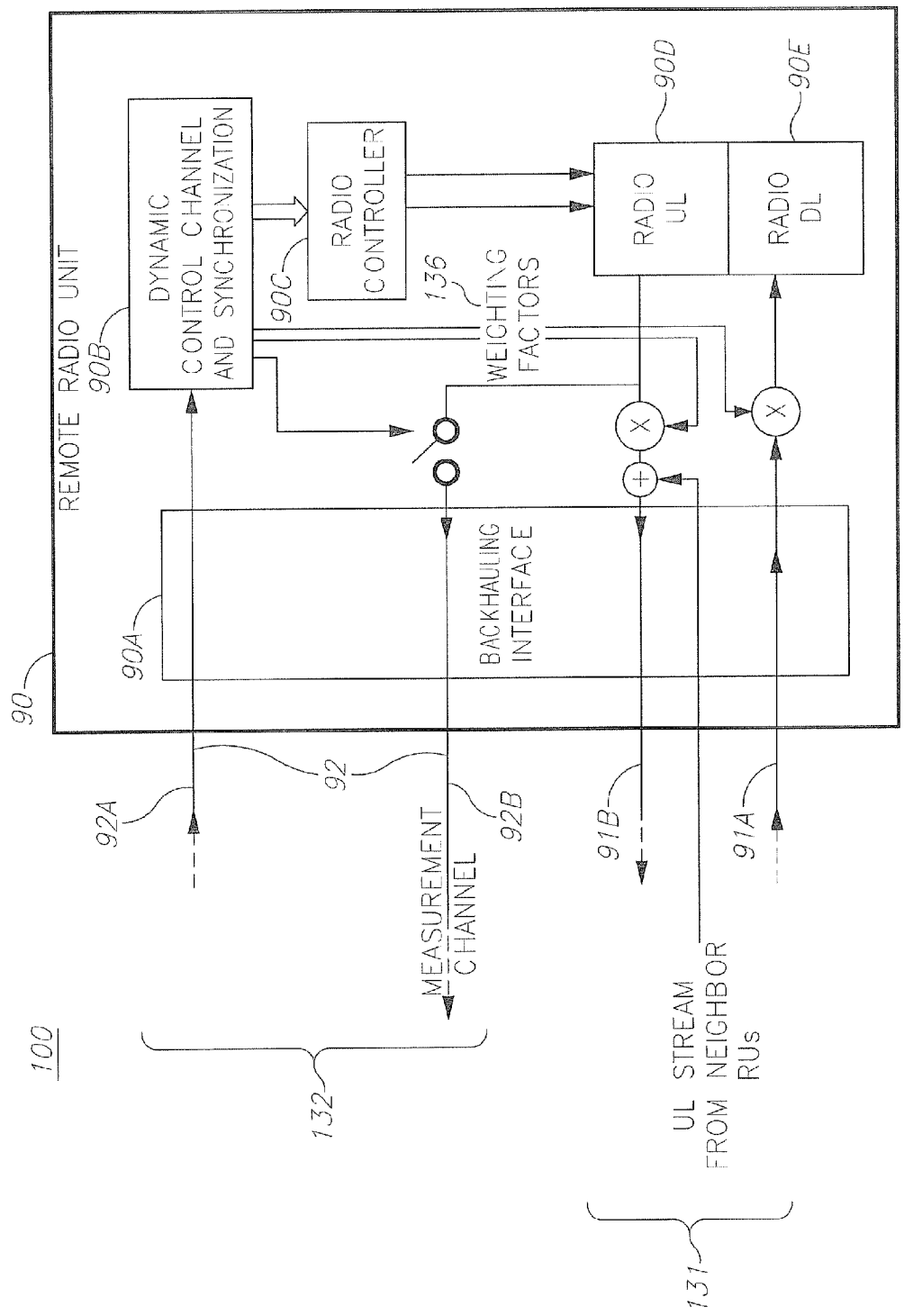
Figure 4C:
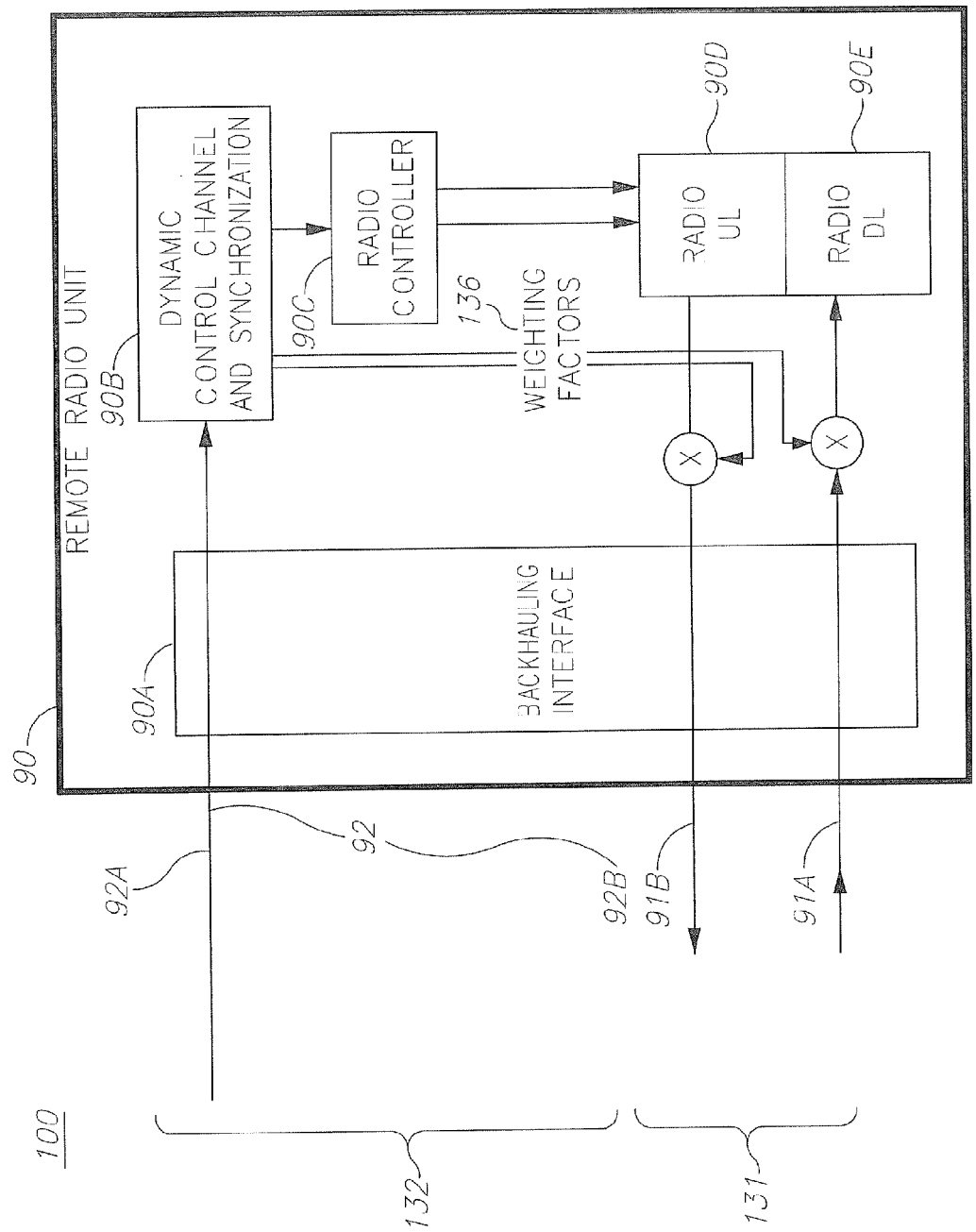

FIGS. 4A-4C are schematic functional block diagrams of system 100, according to some embodiments of the invention. FIG. 4A illustrates access unit 80 and distributing and combining unit 120 while FIGS. 4B and 4C illustrate two optional configurations of remote radio units 90—FIG. 4B illustrates a configuration with radio units 90 in a chain mode topology and FIG. 4C illustrates a configuration with radio units 90 in a star mode topology.

System 100 schematically comprises a traffic plane 131 on which the actual communication is transferred, as well as data and settings relating to the radio communication (streams 91B and 96B illustrating the uplink (UL) channel, streams 91A and 96A illustrating the downlink (DL) channel), with traffic module 85 operating the traffic path. System 100 further comprises a coordination plane 132 that comprises a measurement path (streams 92B and 97B) and a control path (streams 97A and 92A). The traffic path receives a single or multiple combined baseband streams transferred by remote radio units 90, while the control path sets measurement assignments to remote radio units 90 and receives the corresponding messages and transmissions therefrom. Traffic plane 131 includes the control plane and the user plane of standard communication systems.

The part of remote radio units 90 in FIG. 4B illustrates a generic remote radio unit 90 that may include connection to other remote radio units 90 that is used to transfer control data to and from measurement unit 110. These connections are optional, depending on the configuration of the communication system as a whole and the interconnections among remote radio units 90.

Remote radio units 90 further comprise a dynamic control channel and synchronization unit 90B corresponding and in communication through the control channel with control channel and synchronization unit 119 in measurement unit 110 and controlling via a radio controller 90C radio UL 90D and radio DL 90E. Control channel and synchronization unit 90B is dynamic in that it continuously update the settings of remote radio units 90 according to control commands, to correspond with the dynamically changing specified criteria. For example, control channel and synchronization unit 90B updates parameters of radio controller 90C and also control chained remote radio units 90 as well as weighting factors 136 relating to uplink and downlink radio signals.

Measurement unit 110 comprises a control channel and synchronization unit 119 which sets remote radio unit assignment to a measurement channel 97B in the coordination plane. Measurement channel 97B contains the baseband samples that are transferred by a specific remote radio unit 90 or by a specified combination of remote radio units 90. Measurement unit 110 sends a command to remote radio units 90 via control channel 97A, where it assigns specific remote radio units 90 that would transfer the baseband samples via measurement channel 97B.

Measurement unit 110 receives transmission samples from specified remote radio units 90, samples from measurement channel 97B and performs estimations for a specified mobile communication device 70 (also referred to as UE—user equipment), for example regarding: uplink signal to noise and interference ratio (UL SINR), path loss, received signal strength indicator (RSSI), uplink channel estimation, BER (bit error rate) estimation, performed by providing side info from traffic plane 131 containing the modem configuration while receiving a specific user, such as ARFCN, OVSF code, UL grant time stamp per UE, UL frequency grant per UE, UL code allocation per UE, to the coordination plane.

After all the measurements are performed for all remote radio units 90 and mobile communication devices 70, a decision process is being carried out and coordination plane 132 sends a command to distributing and combining unit 120 and to remote radio units 90 where and how they would set UL/DL weighting factors 136 and the associated relevant UL/DL traffic stream. Distributing and combining unit 120 is in communication with a distribute and combine control 121 that is in communication with control channel and synchronization module 119 over control channel 97A.

Figure 5:
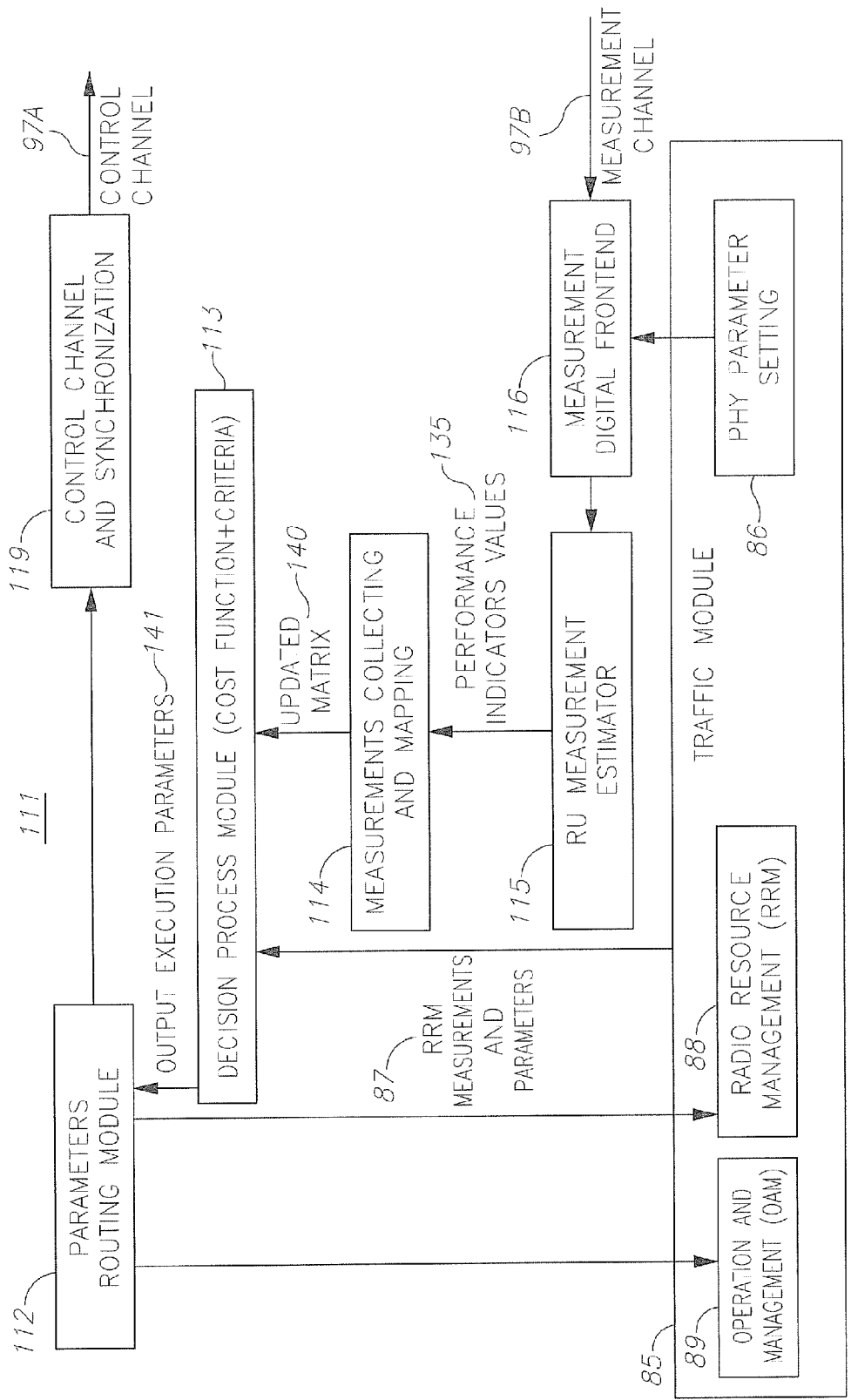
FIG. 5 is a schematic high level illustration of a managing part of the measurement unit, according to some embodiments of the invention.

FIG. 5 is a schematic high level illustration of a managing part 111 of measurement unit 110, according to some embodiments of the invention. FIG. 5 illustrates the modules of measurement unit 110 in FIG. 4 together with the radio signals and parameters that are transferred between the modules and are processes thereby.

Incoming uplink control information 97B is received at a measurement digital frontend 116, which is controlled by a physical layer (phy) parameters setting module 86 in traffic module 85. Phy parameters setting module 86 indicates for example the relation of incoming information 97B to specific remote radio units 90 (RUs). Measurement digital frontend 116 then provides RU related data to RU measurement estimator 115 which measures the values of performance indicators 135 and delivers the measurements to a measurements collecting and mapping module 114. Measurements collecting and mapping module 114 updates matrix 140 with the measured performance indicator values with respect to RUs 90 and UEs 70 (see FIG. 3).

The updated matrix is transferred to a decision process module 113, which is the heart of system 100, in that it carries out the dynamic optimization of system 100 and continuously determines the dynamically changing specified criteria. Decision process module 113 calculates cost functions from matrix 140 as well as from additional data 87 received from traffic module 85 comprising e.g. data received from mobile communication devices 70 (UEs) and/or from nodes in the communication system over traffic plane 131 regarding the quality of the communication, bandwidths etc. Additional data 87 may comprise standard messages that go through traffic plane 131 according to the specific types of network (e.g. 3G, LTE) and may include measurements and parameters relating to the traffic. For example, additional data 87 may comprise data from radio resource management (RRM) module 88 and operation and management (OAM) module 89 in traffic module 85. Decision process module 113 then derives from the calculated cost function according to optimization criteria output execution parameters 141 for updating the dynamically changing specified criteria. A parameters routing module 112 distributes the updated parameters to control channel and synchronization module 119 as well as to radio resource management (RRM) module 88 and operation and management (OAM) module 89 in traffic module 85, for example to associate between a specific mobile communication device 70 and a specific stream.

In embodiments, the present invention comprises a kit for providing dynamic managing capabilities to a legacy wireless communication network comprising at least one access unit 80 connected to remote radio units 90 that are deployed to cover a specified area and are in communication with mobile communication devices 70. The kit comprises distributing and combining unit 120 and measurement unit 110. Distributing and combining unit 120 is in communication with remote radio units 90 and is arranged to digitally combine uplink radio signals from remote radio units 90 and digitally distribute downlink radio signals from access unit 80 according to dynamically changing specified criteria.

Measurement unit 110 may be embedded in access unit 80 and is arranged to carry out the following operations: Measure, at access unit 80 and from at least one of the uplink radio signals and the downlink radio signals, at least one performance indicator 135 of the communication between remote radio units 90 and mobile communication devices 70, to yield a corresponding matrix 140 of performance indicator values for at least one combination of remote radio units 90 and mobile communication devices 70; calculate at least one cost function from matrix 140 of performance indicator values; generate output execution parameters 141 by applying a decision process that is based on the at least one calculate cost function, update the specified criteria according to the generated output execution 141; and reiterate the measuring, the calculating and the updating to continuously update the wireless communication network.

By upgrading the legacy wireless communication network with the kit, "smart" managing capabilities are added, without a need for extensive consideration of the release version of the network and the individual capabilities of UEs 70 and RUs 90.

Figure 6:
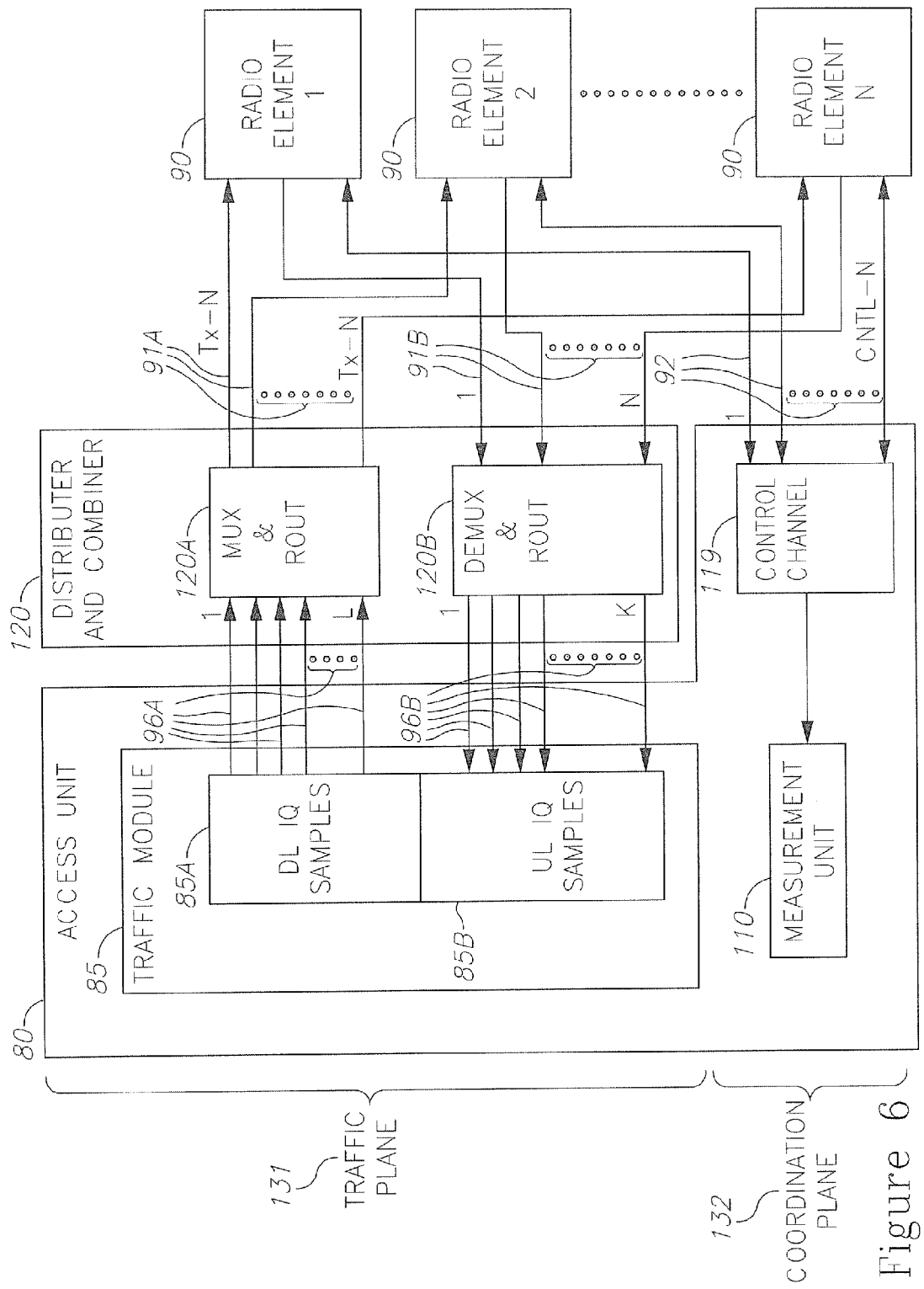
FIG. 6 is a schematic functional block diagram of an access unit, according to some embodiments of the invention.

FIG. 6 is a schematic functional block diagram of system 100, according to some embodiments of the invention. System 100 comprises traffic plane 131 and coordination plane 132, as embodied in access unit 85 and distribution and combining unit 120. FIG. 6, together with FIG. 4, illustrates in more detail the data streams in system 100.

Traffic plane 131 includes a downlink modulated stream 96I: including 1 . . . L streams and an uplink modulated stream 96A including 1 . . . K streams between traffic module 85, and distributer 120A (comprising a multiplexer and router) and combiner 120B (comprising a de-multiplexer and router) in distributing and combining unit 120, respectively. These, in turn, communicate via a backhauling interface 90A with radio uplink 90D and radio downlink 90E in remote radio units 90.

Figure 7:
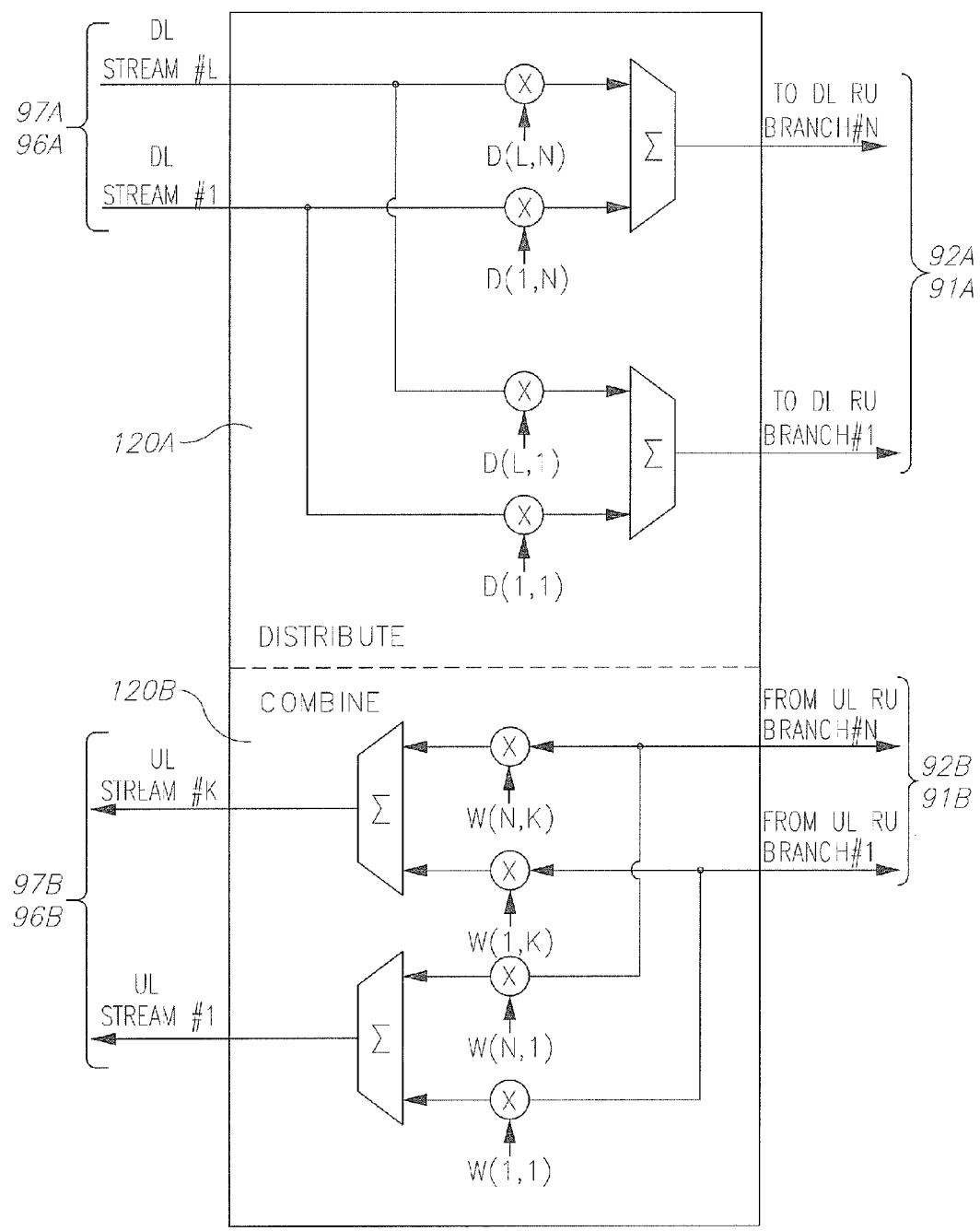
FIG. 7 is a high level schematic illustration of the functionality of a distributing and combining unit, according to some embodiments of the invention.

FIG. 7 is a high level schematic illustration of the functionality of distributing and combining unit 120, according to some embodiments of the invention.

Distributer 120A receives L downlink (DL) streams from access unit 80, multiplexes the streams and routes them to N remote radio units (RUs) 90 according to the dynamically changing specified criteria. Combiner 120B receives N uplink (UL) streams from the corresponding remote radio units (RUs) 90, de-multiplexes the streams and routes them as K streams to digital frontend 116 in access unit 80 (stream 97B). In that, distributing and combining unit 120 takes into account the configuration of remote radio units 90 and applies the multiplexing, de-multiplexing and routing according to the interconnections between RUs 90, e.g. in star, chain, ring configurations or in a combination thereof, or in a generalized manner—branches 89 (see also generic remote radio element 90 in FIG. 4B).

Distributing and combining are carried out according to parameter matrices $D(i,j)$ and $W(i,j)$ respectively (see also FIG. 3) that are dynamically changed according to output execution parameters 141. $D(i,j)$ and $W(i,j)$ may include real or imaginary scalars that define the weighting, selection and routing of DL and UL streams through RU branches 89 and RUs 90 to UEs 70.

In embodiments, system 100 comprises distributing and combining unit 120 connecting remote radio units 90 with access unit 80 by routing (e.g. digitally) radio signals therebetween according to dynamically changing specified criteria; and measurement unit 110 implemented in access unit 80, arranged to continuously determine and update the dynamically changing specified criteria, by measuring performance indicators 135 from the routed radio signals to yield corresponding matrix 140 of performance indicator values and generating a plurality of output execution parameters by applying a decision process to at least one cost function that is calculated from matrix 140.

In embodiments, the decision process enhances routing to remote radio units 90 according to a number of proximate users thereof and according to energetic considerations. Output execution parameters may comprise gain factors, beam forming parameters and other technical parameters. Distributing and combining unit 120 is arranged to route (e.g. digitally) the radio signals with respect to a given configuration of remote radio units 90, such as star, chain and ring configurations and combinations thereof.

Figure 8:
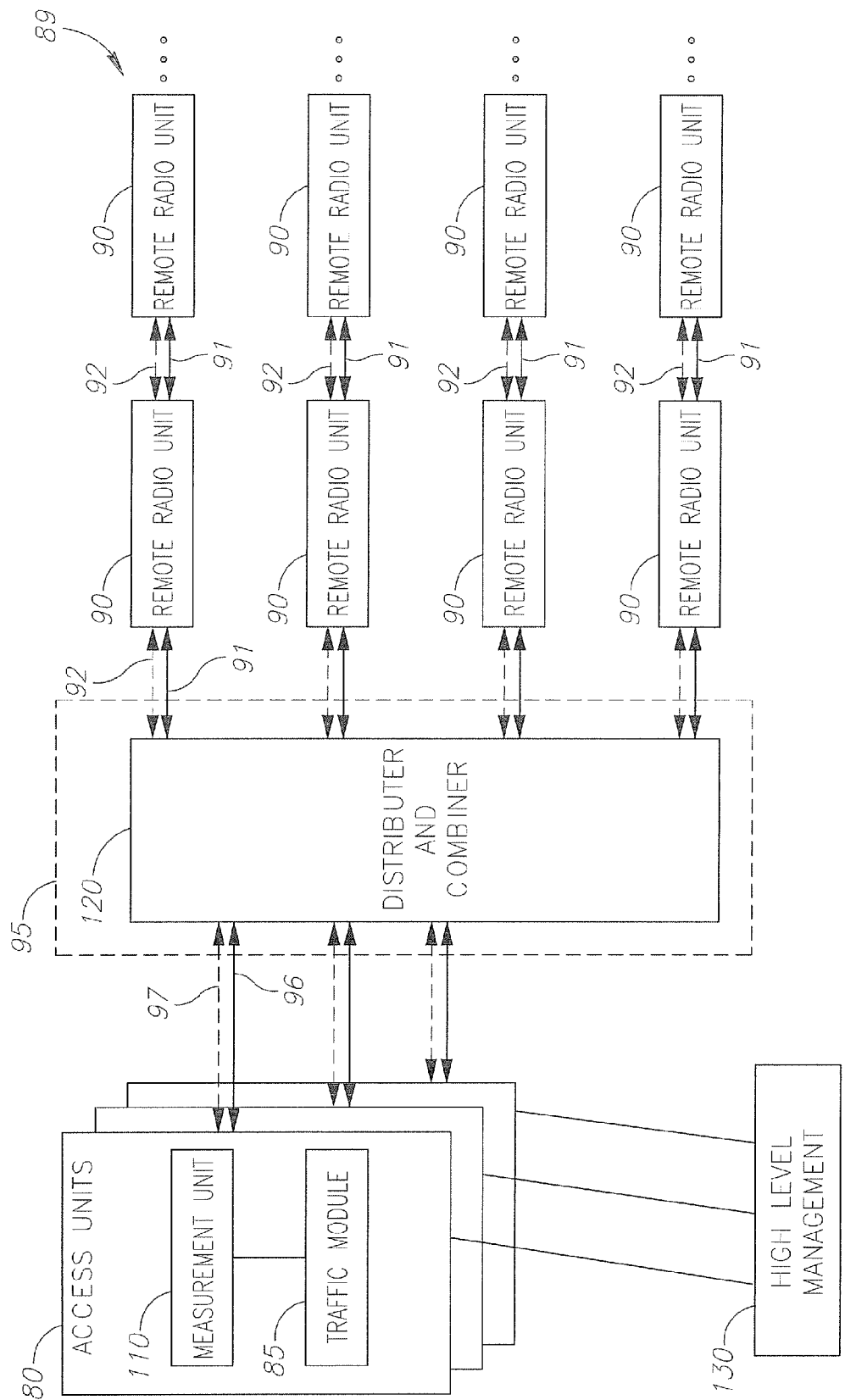
FIG. 8 is a schematic functional block diagram of the system with multiple access units, according to some embodiments of the invention.

FIG. 8 is a schematic functional block diagram of system 100 with multiple access units 80, according to some embodiments of the invention.

System 100 further allows managing several access units 80 and dynamically change the way downlink and uplink data is transferred via remote radio units 90 to mobile communication devices 70. A high level management unit 130 may change parameters by which each measurement unit 110 in each access unit 80 controls communication therethrough. For example, high level management unit 130 may provide additional performance indicators for specific access units 80 such as the path loss between a UE which is associated with RUs of the neighbor access unit and the RUs of the desired access unit. High level management unit 130 may further report on the RU level of the neighbor access unit. As a result the optimization would also include the arguments which are based on the extra performance indicators.

Relating to the generalization presented above, addition of access units 80 increases the possible transmission and reception samples as well and the number of performance indicators that may be taken into account when calculating the cost functions, and hence enhance the optimization carried out by the system.

In another example, at least one access unit 80 may comprises a main access unit and a plurality of baseband modems, each baseband modem being in communication with a specified subset of the remote radio units 90.

Figure 9:
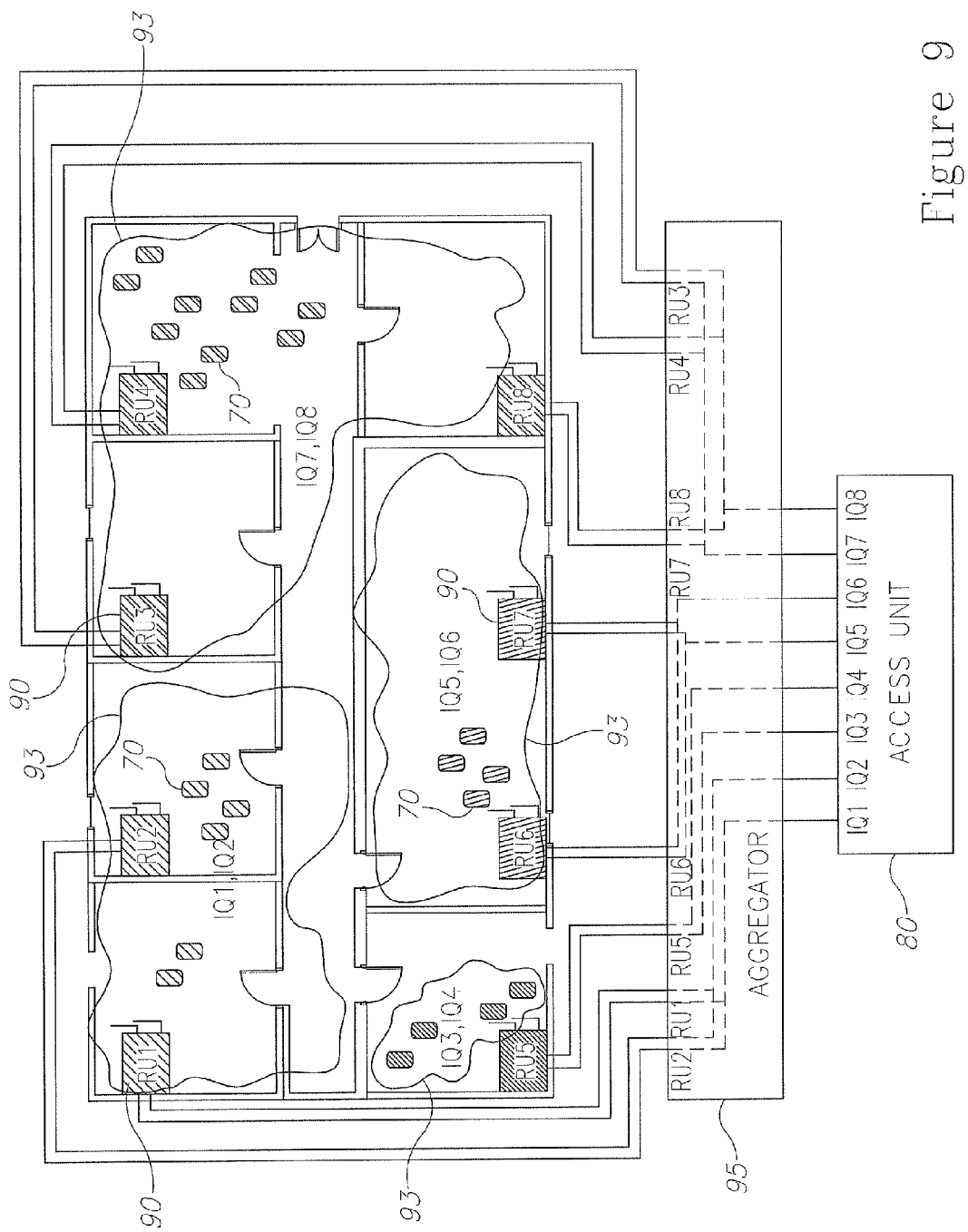
FIG. 9 is a schematic functional block diagram of the system in a Space-Division Multiple Access (SDMA) implementation, according to some embodiments of the invention.

FIG. 9 is a schematic functional block diagram of system 100 in a Space-Division Multiple Access (SDMA) implementation, according to some embodiments of the invention. In such embodiment, several areas 93 (e.g. of a building) are covered by subsets of remote radio units 90, which are connected via aggregator 95 to access unit 80 (e.g. via line). Subgroups of mobile communication devices 70 are in communication with the subsets of remote radio units 90.

Access unit 80 comprises measurement unit 110 that continuously determines and updates the dynamically changing specified criteria with respect to the spatial configuration of the subgroups of mobile communication devices 70 and the subsets of remote radio units 90.

Figure 10:
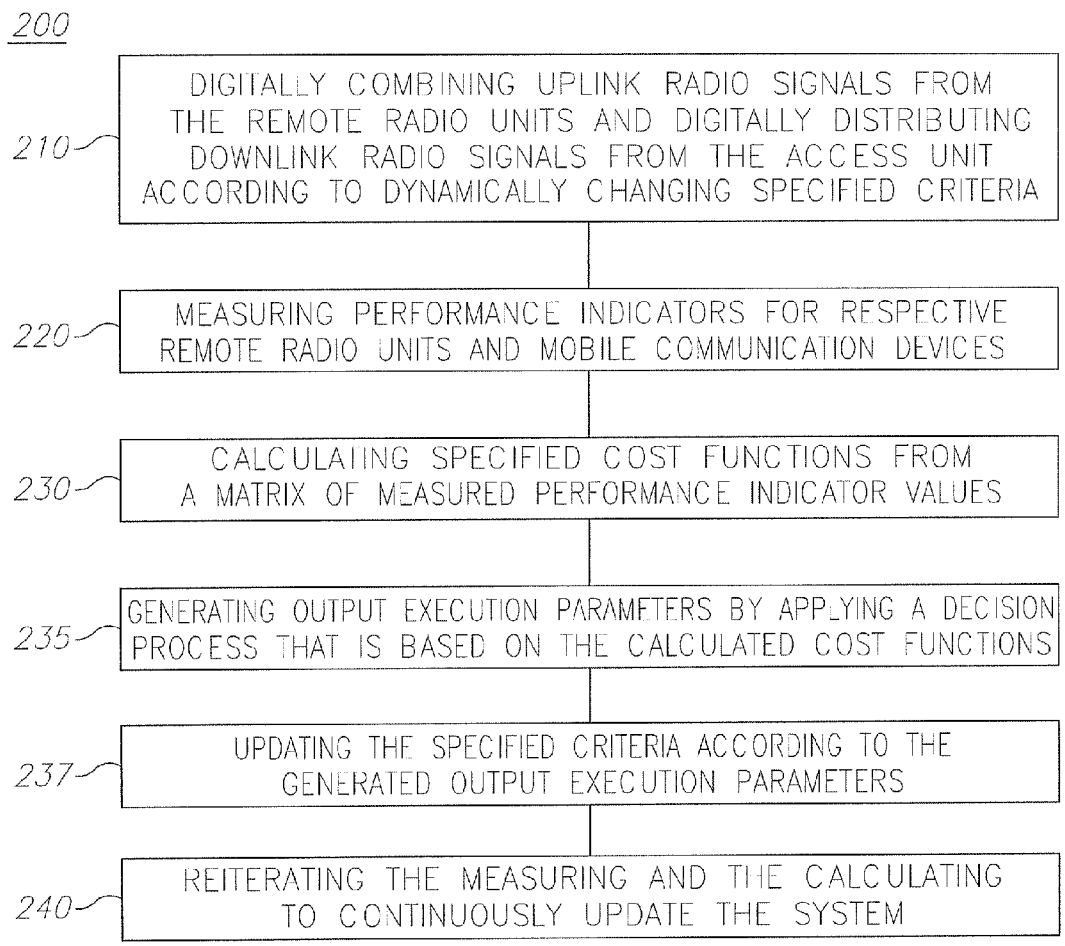
FIG. 10 is a high level flowchart illustrating a method of coordinating a distribution of radio signals, according to some embodiments of the invention.

FIG. 10 is a high level flowchart illustrating a method 200 of coordinating a distribution of radio signals, according to some embodiments of the invention.

Method 200 manages wireless communications by at least one access unit connected via a distributing and combining unit to a plurality of remote radio units that are deployed to cover a specified area and are in communication with a plurality of mobile communication devices.

Method 200 comprises configuring the distributing and combining unit to combine uplink radio signals from the remote radio units and to distribute downlink radio signals from the access unit according to dynamically changing specified criteria (stage 210), wherein the combining and distributing may be carried out digitally; measuring (stage 220), e.g. at the at least one access unit, from at least one of the uplink radio signals and the downlink radio signals, at least one performance indicator of the communication between the remote radio units and the mobile communication devices, to yield a corresponding matrix of performance indicator values for at least one combination of the remote radio units and the mobile communication devices; calculating at least one cost function from the matrix of performance indicator values (stage 230); generating a plurality of output execution parameters by applying a decision process that is based on the at least one calculate cost function (stage 235); updating the specified criteria according to the generated output execution parameters (stage 237); and reiterating the measuring, the calculating and the updating to continuously update the dynamically changing specified criteria, measurement unit 110 or generally system 100 (stage 240).

Figure 11:
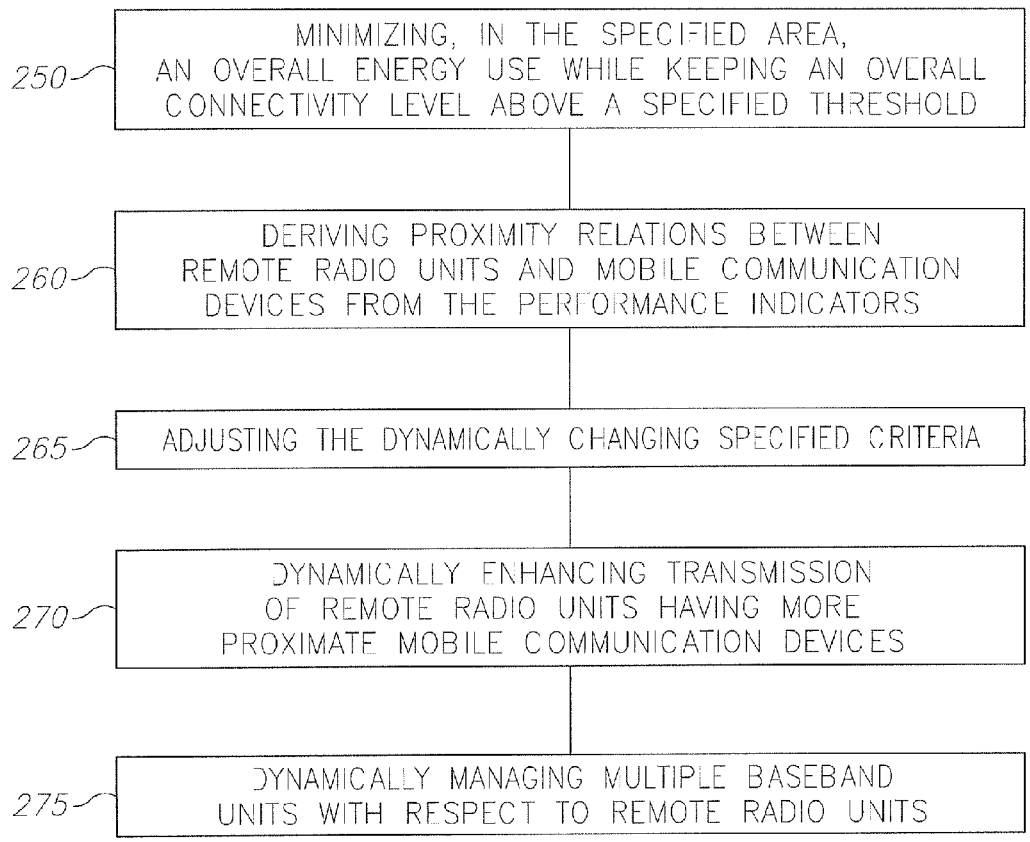
FIG. 11 is a high level flowchart illustrating an example for applying the method of managing communications, according to some embodiments of the invention.

FIG. 11 is a high level flowchart illustrating an example for applying method 200 of managing communications, according to some embodiments of the invention. The example is aimed at minimizing, in the specified area, an overall energy use while keeping an overall connectivity level above a specified threshold (stage 250).

Method 200 may further comprise deriving proximity relations between remote radio units and mobile communication devices from the performance indicators (stage 260) and adjusting the dynamically changing specified criteria (stage 265) to dynamically modify transmission of remote radio units with respect to a number of proximate mobile communication devices as derived from the performance indicator values, e.g. dynamically enhance or diminish transmission of remote radio units having respectively more or less proximate mobile communication devices with respect to other remote radio units (stage 270).

Method 200 may further comprise dynamically managing multiple access units with respect to remote radio units (stage 275).

Advantageously, system 100 and method 200 optimize interference mitigation using the remote radio units' allocation domain, which is not available in prior art solutions. Furthermore, the present invention utilizes and creates isolated areas for reuse of resources, by deactivating, weighting and combining of remote radio units 90 and reusing air resources in the same PCI (Physical Cell Identifier), supports hot zone scenarios where there is a concentration of mobile communication devices 70 in a specific location, by the smart routing of the physical resources and provides the benefits in spectral efficiency, coverage and capacity for legacy mobile communication devices 70.

System 100 and method 200 avoid multiple handovers and improve the quality of experience (QoE) in mobility scenarios, reduces radio network planning efforts by being self configured and dynamically changing according to the physical variations and the mobile communication device 70's mobility status with regard to the system. System 100 is very simple to update and upgrade by modifying access unit 80 without having to modify remote radio units 90 and the infrastructure.

In particular, method 200 enables optimal remote radio units selection for MIMO (multiple input, multiple output) coverage channel transmission, includes a special backhauling architecture for distributed coordinated remote radio units 90. Method 200 may comprise measuring channel patterns at the physical level, and allocating physical channels dynamically.

Method 200 further comprises creating a new UE localization mechanism, that of tracing the location of each registered mobile communication devices 70 on the covered area. This capability is used for the system coordination and could also be used for indoor location based services.

Figure 12A:
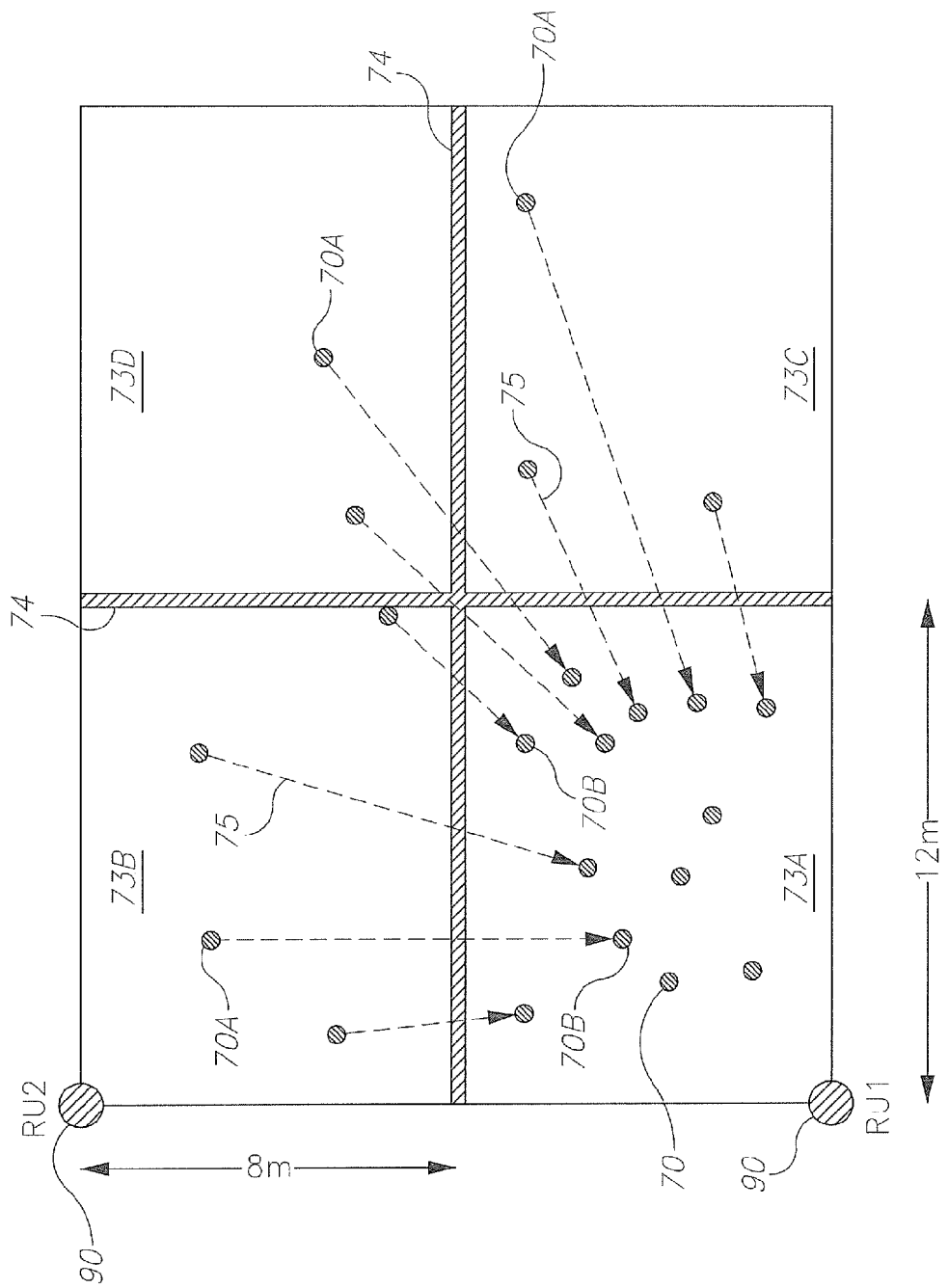
FIGS. 12A-12C illustrate a user scenario and simulation results associated therewith, according to some embodiments of the invention.
Figure 12B:
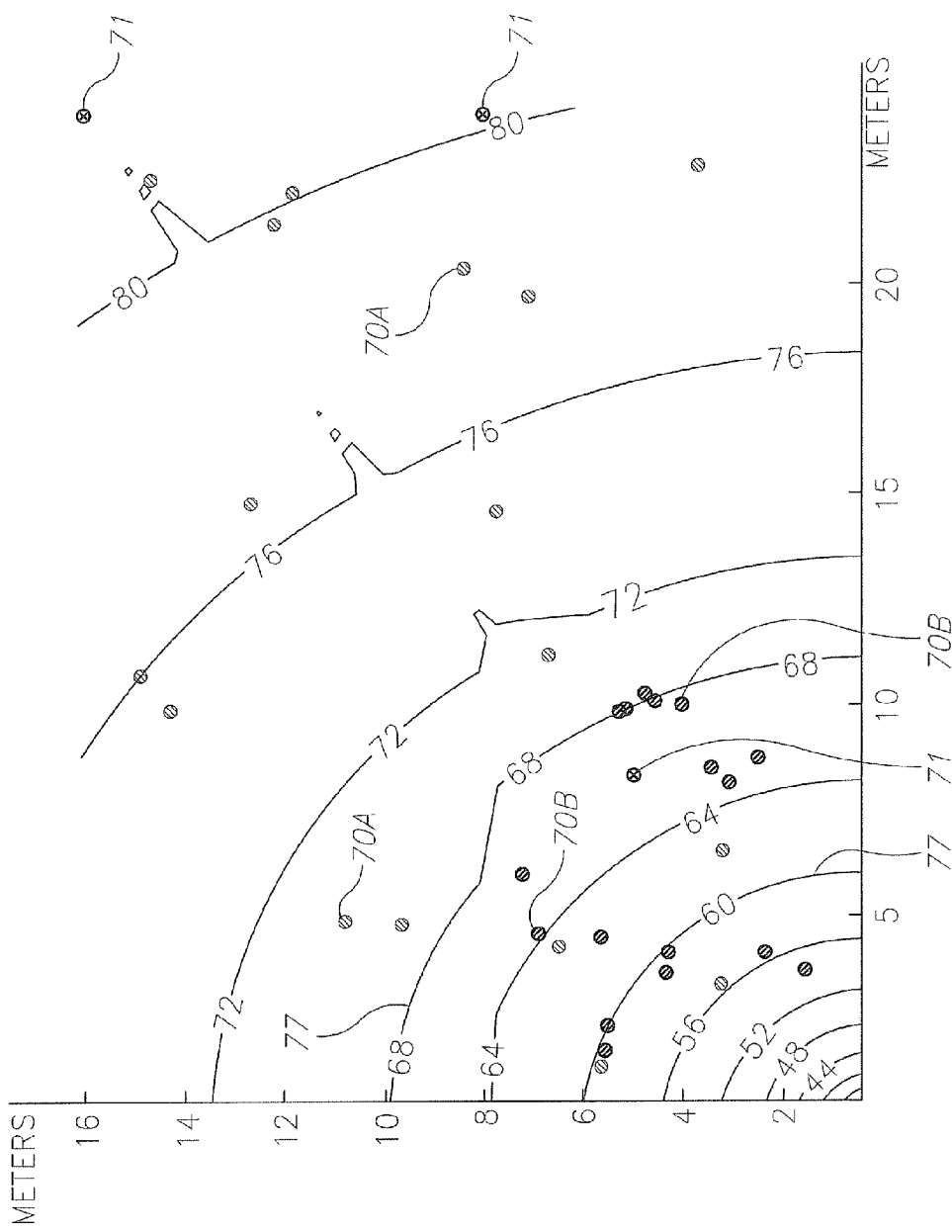
Figure 12C:
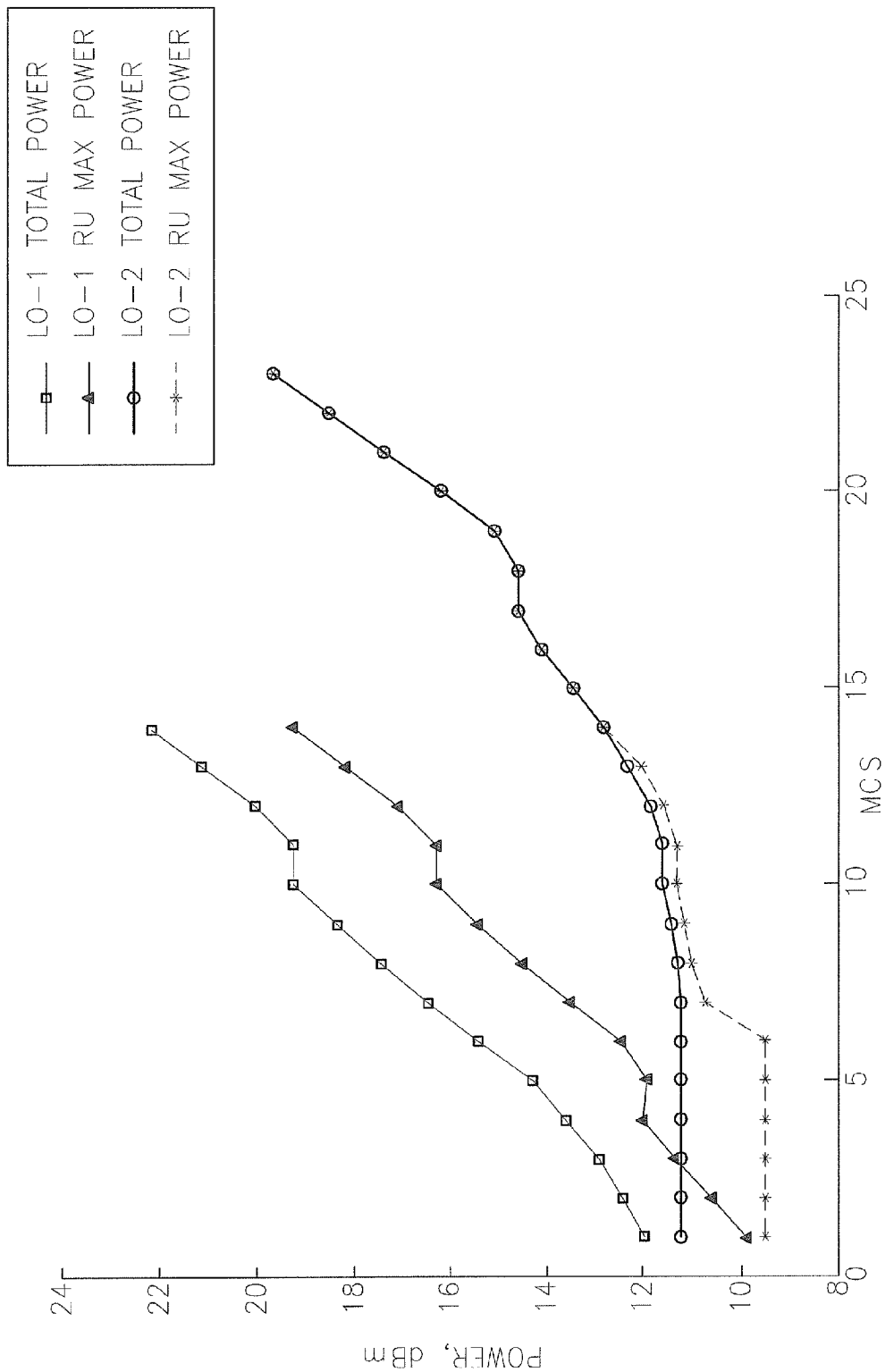

FIGS. 12A-12C illustrate a user scenario and simulation results associated therewith, according to some embodiments of the invention. The exemplary simulation results illustrate the efficiency of the proposed system and method.

FIG. 12A illustrates a scenario in which twenty UE's 70 are initially uniformly spread over four rooms 73A-73D which are separated by light walls 74 (Layout 1, LO1, with the UEs marked 70A). The users from rooms 73B-73D then move (75) and concentrate with their UE's 70 in room 73A, still uniformly spread (Layout 2, LO2, with the UEs marked 70B). UEs 70 are serviced by two RUs 90. An optimization algorithm is used to set power levels for a common channel (one or several grouped common channels) and for PDSCH (Physical Downlink Shared Channel).

FIG. 12B illustrates simulation results as the path losses of UE's 70 with respect to RU1 as a function of their positions. FIG. 12B presents lines 77 of equal path loss (in dB down, i.e.

the signal path loss from RU1 ) with respect to RU1 with respect to the scenario presented in FIG. 12A, denoting the positions of UE's 70A in Layout 1 (areas 73A-D in FIG. 12A) and the positions of UE's 70B in Layout 2 (area 73A in FIG. 12A), as well as positions of points 71 that denote the required coverage range for the common channel with respect to both RUs (these points are not associated with any particular UE 70).

FIG. 12C illustrates simulation results as the maximum between the power of the RU's 90 (max(RU1 , RU2 )) with respect to the total power (RU1 +RU2 ). MCS (modulation and coding scheme) denotes the MCS used by all UEs in the PDSCH, LO-1 and 2 denote Layout 1 (areas 73A-D in FIG. 12A) and Layout 2 (area 73A in FIG. 12A), respectively, Total power denotes the total power of all RUs in the respective layout.

While in Layout 1, with UEs 70A spread, the total power is larger than the maximal power of any single RU (i.e. both RUs operate at high power), in Layout2 the RU with maximal power is very close to the total power of the RUs, meaning that power is saved in the other RU. This is especially pronounced in the higher MCS, as low MCS are still used for the common channel in both RUs.

The outcome of the simulation is the total transmit power as function of MCS at the PDSCH. The simulation shows that for LO-1 the common channel (RS) is powered over the minimum needed to provide necessary SINR because of restriction (EPRE of PDSCH)−(EPRE of RS)≤3 dB imposed by the range of possible values of $\rho_A$ (DL Power Allocation parameters per UE as specified in 3GPP TS36.213 section 5.2; EPRE being Energy Per Resource Element). In the considered configuration, the algorithm provides for approximately 5.5 dB gain comparatively to the system where the gains of the RUs are set statically and uniformly (prior art "DAS reference").

In embodiments, the present invention introduces new architectural concept that coordinates the distributed radio signals between Access units and distributed remote radio front-end units to maximize air interface utilization in the various wireless communication standards such as GSM, WCDMA, HSPA, LTE and WiFi. While the prior-art approaches usually coordinate the distributed access unit through the Radio Resource Management (RRM in Layer 3 of the protocol stack), the coordination of distributed radio in the present invention is advantageously performed to the access point's baseband or RF signals and between an access unit and plural remote radio units.

Therefore, in a case of several access units that are connected to remote radio units through the central switch unit (aggregator), the present invention enables the dynamic transport of the access Unit's signals to specific locations according to the required traffic and users' location. This way, the invention enables the maximization of the access unit capacity utilization while reducing number of hand-offs from one access unit to another and instead using smooth mobility from one remote radio unit to another as well as reducing the overall inter-access units interferences.

Hence, the present invention provides a new system and topology/architecture of wireless communication networks. The system and method improve (e.g. indoors) coverage and the total available capacity of different cellular networks.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system for coordinating a distribution of radio signals, comprising:
    a distributing and combining unit connecting remote radio units with at least one access unit by routing radio signals between the at least one access unit and the remote radio units, according to dynamically changing specified criteria; and
    at least one measurement unit arranged to determine and update the dynamically changing specified criteria, by measuring at least one performance indicator from the routed radio signals to yield a corresponding matrix of performance indicator values and generating a plurality of output execution parameters by applying a decision process to at least one cost function that is calculated from the matrix;
    wherein the access unit is configured to update the specified criteria according to the generated output execution parameters; and
    wherein the system is further configured to reiterate the measuring, the calculating and the updating to continuously update the system.

2. The system of claim 1, wherein the routing is carried out digitally.

3. The system of claim 1, wherein the at least one measurement unit is implemented in the at least one access unit.

4. The system of claim 1, wherein the decision process enhances routing to the remote radio units according to a number of proximate users thereof.

5. The system of claim 1, wherein the distributing and combining unit is arranged to digitally route the radio signals with respect to a given configuration of the remote radio units comprising at least one of: star, chain, ring and a combination thereof.

6. The system of claim 1, wherein the plurality of output execution parameters comprise beam forming parameters.

7. The system of claim 1, wherein the at least one performance indicator comprises at least one of: path losses of uplink and downlink channels, channel pattern estimation, channel tap, Doppler spreading estimation, time of arrival, Signal to Noise Ratio (SNR), Signal to Interference plus Noise Ratio (SINR), reference symbol and pilot power estimation, and any function that has transmission and reception samples as arguments.

8. A system for coordinating a distribution of radio signals, the system comprising:
a plurality of remote radio units that are deployed to cover a specified area and are in communication with a plurality of mobile communication devices;
a distributing and combining unit in communication with the remote radio units;
at least one access unit connected via the distributing and combining unit to the plurality of remote radio units; and
at least one measurement unit,
wherein:
the distributing and combining unit is arranged to combine uplink radio signals from the remote radio units and to distribute downlink radio signals from the access unit according to dynamically changing specified criteria;
the at least one measurement unit is configured to:
measure, at the at least one access unit and from at least one of the uplink radio signals and the downlink radio signals, at least one performance indicator of the communication between the remote radio units and the mobile communication devices, to yield a corresponding matrix of performance indicator values for at least one combination of the remote radio units and the mobile communication devices;
calculate at least one cost function from the matrix of performance indicator values; and
generate a plurality of output execution parameters by applying a decision process that is based on the at least one calculated cost function, and the access unit is further configured to:
update the specified criteria according to the generated output execution parameters; and
reiterate the measuring, the calculating and the updating to continuously update the system.

9. The system of claim 8, wherein the dynamically changing specified criteria are further adjusted to dynamically modify transmission of remote radio units with respect to a number of proximate mobile communication devices as derived from the performance indicator values.

10. The system of claim 8, wherein the distributing and combining are carried out digitally.

11. The system of claim 8, wherein the at least one measurement unit is implemented in the at least one access unit.

12. The system of claim 8, wherein a configuration of the remote radio units comprises at least one of: star, chain, ring and a combination thereof.

13. A method of coordinating a distribution of radio signals by at least one access unit connected via a distributing and combining unit to a plurality of remote radio units that are deployed to cover a specified area and are in communication with a plurality of mobile communication devices, the method comprising:
configuring the distributing and combining unit to combine uplink radio signals from the remote radio units and distribute downlink radio signals from the access unit according to dynamically changing specified criteria;
measuring, from at least one of the uplink radio signals and the downlink radio signals, at least one performance indicator of the communication between the remote radio units and the mobile communication devices, to yield a corresponding matrix of performance indicator values for at least one combination of the remote radio units and the mobile communication devices;
calculating at least one cost function from the matrix of performance indicator values;
generating a plurality of output execution parameters by applying a decision process that is based on the at least one calculated cost function;
updating the specified criteria according to the generated output execution parameters; and
reiterating the measuring, the calculating and the updating to continuously update the dynamically changing specified criteria.

14. The method of claim 13, wherein the at least one performance indicator comprises at least one of: path losses of uplink and downlink channels, channel pattern estimation, channel tap, Doppler spreading estimation, time of arrival, Signal to Noise Ratio (SNR), Signal to Interference plus Noise Ratio (SINR), reference symbol and pilot power estimation, and any function that has transmission and reception samples as arguments.

15. The method of claim 13, wherein the distributing and combining are carried out digitally.

16. The method of claim 13, further comprising dynamically modify transmission of remote radio units with respect to a number of proximate mobile communication devices as derived from the performance indicator values.

17. The method of claim 13, further comprising dynamically managing multiple access units with respect to the remote radio units.

18. The system of claim 8, wherein the output execution parameters comprise at least one of gain factors and beam forming parameters.

19. A kit for coordinating a distribution of radio signals in a wireless communication network comprising at least one access unit connected to a plurality of remote radio units that are deployed to cover a specified area and are in communication with a plurality of mobile communication devices, the kit comprising:
a distributing and combining unit in communication with the remote radio units and arranged to combine uplink radio signals from the remote radio units and distribute downlink radio signals from the access unit according to dynamically changing specified criteria; and
a measurement unit embedded in the at least one access unit and arranged to:
measure, at the at least one access unit and from at least one of the uplink radio signals and the downlink radio signals, at least one performance indicator of the communication between the remote radio units and the mobile communication devices, to yield a corresponding matrix of performance indicator values for at least one combination of the remote radio units and the mobile communication devices;
calculate at least one cost function from the matrix of performance indicator values;
generate a plurality of output execution parameters by applying a decision process that is based on the at least one calculated cost function;
update the specified criteria according to the generated output execution parameters; and reiterate the measuring, the calculating and the updating to continuously update the wireless communication network.

20. The kit of claim 19, wherein the output execution parameters comprise at least one of gain factors and beam forming parameters.

* * * * *